United States Patent

[11] 3,563,327

[72] Inventor David Mier
 447 Norway Ave., Trenton, N.J. 08629
[21] Appl. No. 777,243
[22] Filed Nov. 20, 1968
[45] Patented Feb. 16, 1971

[54] ELECTRONIC CONTROL AND GUIDANCE SYSTEM FOR VEHICLES
 4 Claims, 2 Drawing Figs.
[52] U.S. Cl. .................................................. 180/65,
 180/79.1, 180/98, 318/576, 318/587, 318/581, 318/681
[51] Int. Cl. ...................................................... B62d 11/04
[50] Field of Search............................................ 180/98,
 79.1, 6.6, 6.2, 7.9, 6.5, 77; 56/26;
 172/2, 5, 6; 318/(Photoelectric digest),
 (Line followers digest), (Vehicle digest)

[56] References Cited
 UNITED STATES PATENTS
| | | | |
|---|---|---|---|
| 2,521,262 | 9/1950 | Smith .......................... | 56/26 |
| 2,832,426 | 4/1958 | Seargeant .................... | 180/6.5X |
| 3,009,525 | 11/1961 | Deliban ....................... | 180/79.1X |
| 3,039,554 | 6/1962 | Hosking et al. ................ | 180/79.1X |
| 3,095,939 | 7/1963 | Hine .......................... | 180/79.1 |
| 3,128,840 | 4/1964 | Barrett ....................... | 180/77 |
| 3,130,803 | 4/1964 | Wiggins ....................... | 180/98X |
| 3,303,821 | 2/1967 | Harris ........................ | 180/6.5X |
| 3,425,197 | 2/1969 | Kita .......................... | 180/79.1X |

Primary Examiner—Kenneth H. Betts
Attorney—Sperry and Zoda

ABSTRACT: A vehicle control and guidance system for steering a vehicle along a predetermined path in response to signals picked up from a path defining conductor. The vehicle is driven by two independent electric motor driven wheels located on opposite sides of the vehicle. Each motor is controlled from a signal sensor on the opposite side of the vehicle from the motor being controlled so that a relatively strong signal from one sensor will increase the speed of the motor on the opposite side of the vehicle. The control link between a sensor and its corresponding motor is provided by a triac fired by a signal controlled variable time constant circuit.

INVENTOR:
DAVID MIER
By: Aperry and Goda
ATTORNEYS

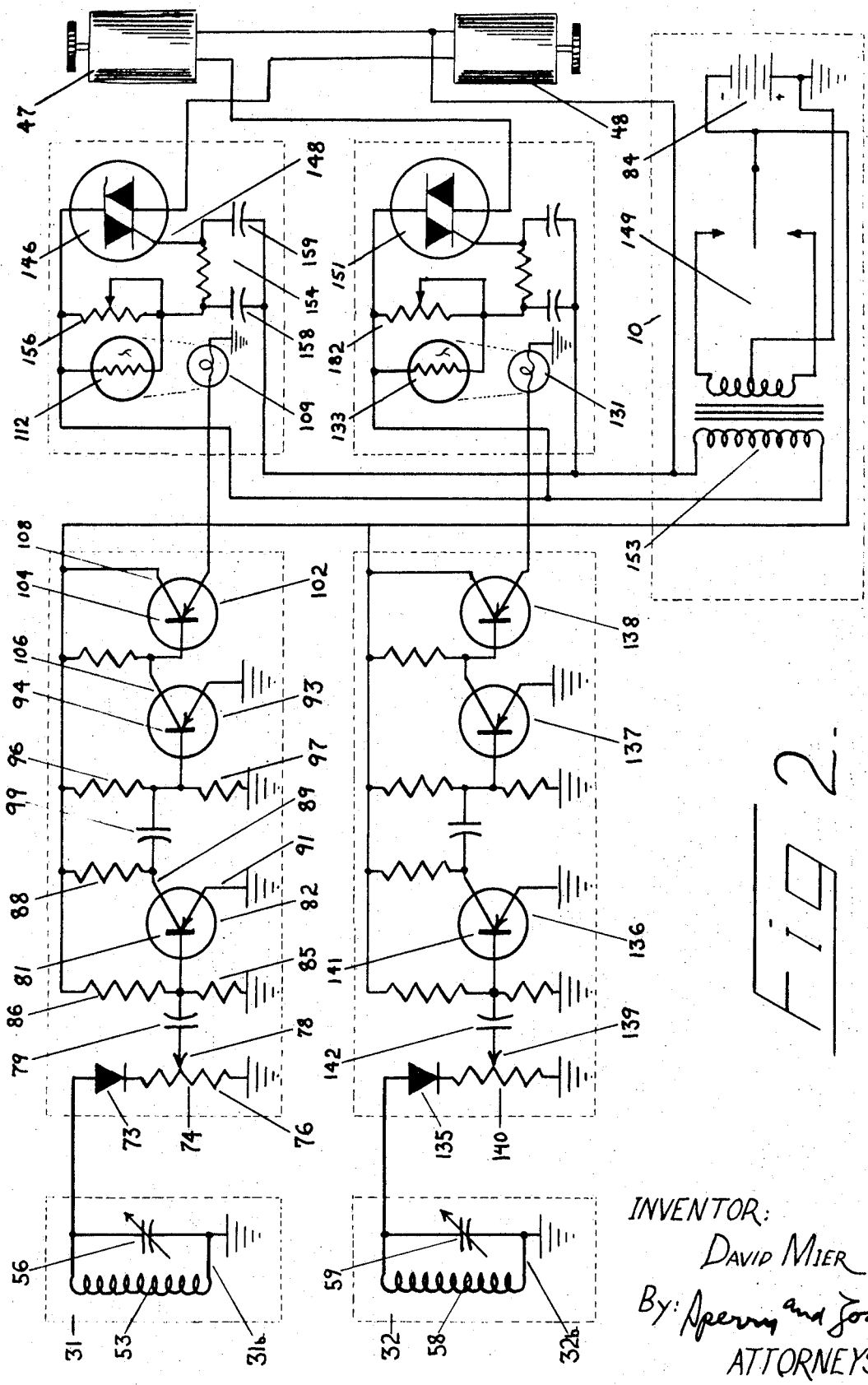

3,563,327

ELECTRONIC CONTROL AND GUIDANCE SYSTEM FOR VEHICLES

BACKGROUND OF THE INVENTION

1. Field of the Invention

This invention relates to steering and guidance of vehicles, and more particularly to a novel electronic system and apparatus for steering a vehicle in response to a guidance signal field radiating from signal propagating means disposed along a predetermined path to be traversed by the vehicle.

In the illustrative embodiment of the invention, the speed and direction of travel of a power driven lawn mower are controlled.

2. Description of the Prior Art

Previous guidance systems employing signal sensing devices for receiving signals from a cable, or the like, have relied on a relatively complicated electrical system using electromagnetic switches and relays, for the most part, to control a steering gear drive motor. The latter sets the steering angle of a vehicle supporting wheel or wheels. In this prior art, extended to automatic operation of a lawn mower, the usual vehicle "power steering" mechanism is employed to control the steering angle of a mower supporting wheel or mechanically coupled wheels.

SUMMARY OF THE INVENTION

In accordance with the present invention, the speed and direction of travel of a vehicle are electronically controlled in response to vehicle path defining signals received from a signal field existing as an AC alternating current magnetic field or a radiated electromagnetic field. In the illustrative embodiment of the invention, described later herein in detail, the speed and direction of travel of a power driven lawn mower are controlled by signals received by a pair of sensors suited to respond to the presence of a chosen signal field. The lawn mower is supported at one end by one or more castorlike pivoted wheels and at or adjacent the other end by a pair of wheels, each of which is separately power driven. The signal from the sensor at one side of the mower is amplified and employed to control the power supplied to the driven wheel on the opposite side of the mower. Likewise, the signal from the other sensor is employed to serve the remaining power driven wheel. The vehicle path defining signals originate from a cable, transmission line, or the like and the sensors are located on the mower so as to lie on opposite sides of the signal originating line. The sensors may conveniently be located one on each side of the mower so that the center line of the mower will be maintained substantially over the signal originating line in operation. What has been said in connection with the mower embodiment of the invention applies equally to embodiment of the invention in any vehicle.

BRIEF DESCRIPTION OF THE DRAWING

FIG. 2 is a schematic of the guidance and control apparatus, part of which appears in FIG. 1.

DESCRIPTION OF THE PREFERRED EMBODIMENT

Figure 1:
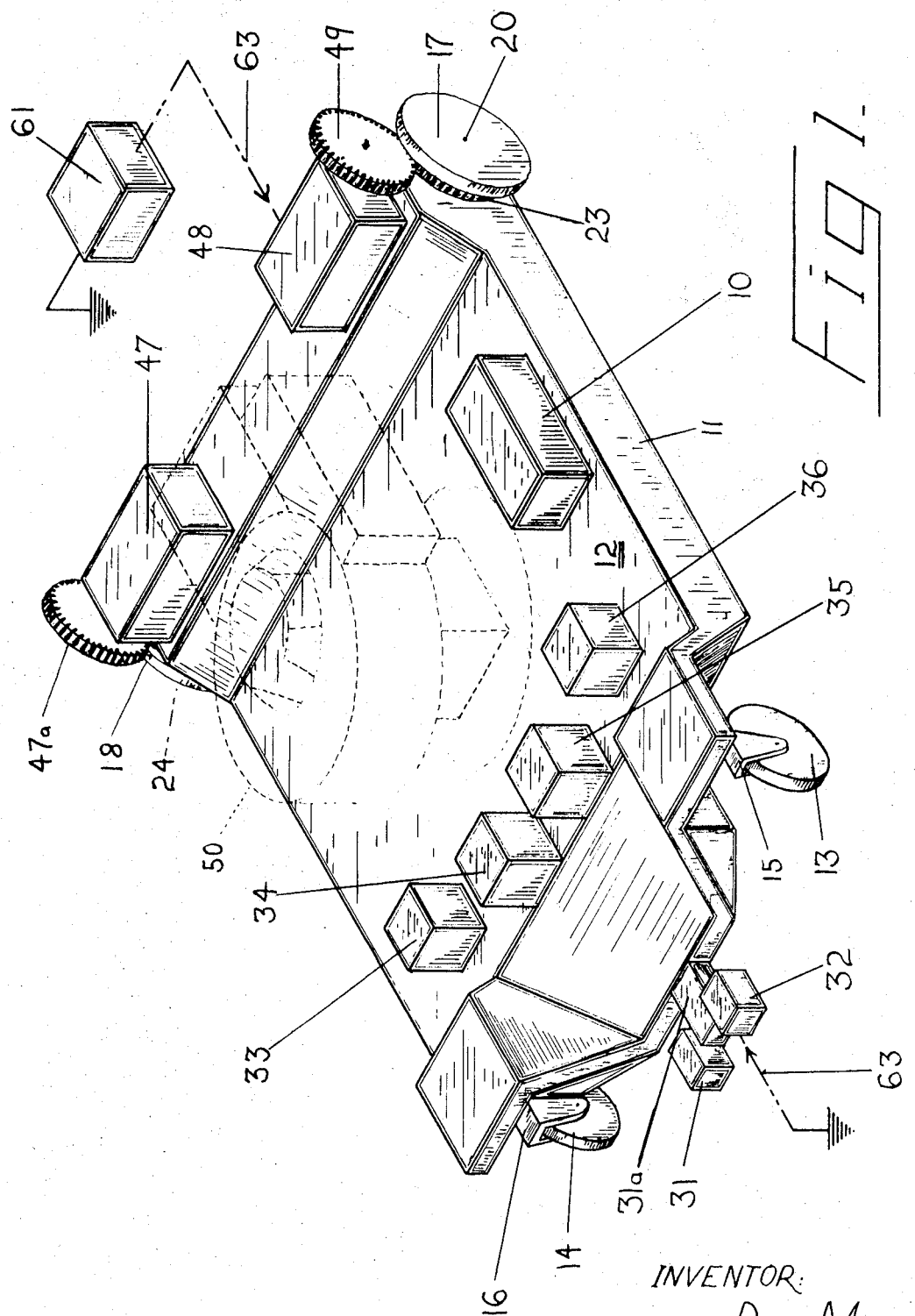
FIG. 1 is a somewhat diagrammatic view in perspective of a power driven lawn mower embodying the invention.

Referring for the present to FIG. 1 of the drawing, the power lawn mower 11, mentioned briefly above, comprises a frame 12 supported adjacent one end by ground wheels 13 and 14. These wheels are journaled in castorlike brackets 15 and 16 pivotally mounted in the frame 12 for rotation about a vertical axis. The opposite end of the frame 12 is supported by drive wheels 17 and 18 rotatably journaled on spindles 20 (one of which appears in FIG. 1) rigidly carried by the frame 12. Drive gears 23 (shown on FIG. 1) and 24 are secured to the drive wheels 17 and 18.

The frame 12 carries sensor assemblies 31 and 32 secured in spaced relationship to a bracket 31a. Housings for an AC power supply 10, a right-hand power switching unit 33, signal detecting and amplifying units 34 and 35, and a left-hand power switch unit 36 are shown as being disposed on the frame 12. The sensor assemblies 31 and 32 and the electrical and electronic features of the apparatus protected by the several housings just mentioned will be described in detail with reference to FIGS. 1 and 2.

Referring again to FIG. 1, a right-hand electric motor 47 having a gear 47a secured to its rotor shaft is mounted on the frame 12. The gear 47a meshes with the gear 24 to drive the wheel 18. In like manner a motor 48 drives the wheel 17 through a gear to the gear 23. These motors are, preferably, of the "universal AC-type" having a commutator so as to possess characteristics similar to those of a direct current series wound motor. For terrain with descending grades a single-phase self-starting induction motor may be used provided that the motor design permits some degree of speed control in response to changes in magnitude of applied voltage. The engine 50 for driving the grass cutting blade (not shown) is suggested in dotted outline.

Referring now to both FIGS. 1 and 2, the sensor assembly 31 comprises a coil 53 and an adjustable capacitor 56 connected to provide a tunable circuit 31b. It will be understood that the inductance of the coil 53 may be adjusted rather than the circuit capacity by a slug or the like. The tunable circuit 32b of the assembly 32 is composed of a coil 58 and an adjustable capacitor 59. An oscillator 61 (FIG. 1) is coupled to a guidance conductor 63 which is to be disposed along the predetermined path to be followed by the mower 11. The output of the oscillator 61 may be modulated or unmodulated and the conductor 63 may be an elongated antenna or a transmission line, depending on the frequency chosen for propagation of the guidance signal. The conductor 63 may be installed in a shallow trench, suspended or be simply laid on the surface to be traversed. As the mower traverses its path the conductor 63 will be substantially centered between the sensor assemblies 31 and 32 for reasons in accordance with the invention to be explained.

Control of the left-hand motor 48 in response to the signal picked up by the right-hand sensor assembly 32 will now be described in detail. The signal from the tunable circuit 31b is coupled to a rectifier or demodulator solid-state diode 73 and the resistor 74 of a gain control potentiometer 76. If the output of the oscillator 61 is modulated the diode 73 will serve as a demodulator. If the output is not modulated the diode will serve as a half-wave rectifier for the received oscillations. A coupling capacitor 79 will insert an AC axis.

The slider 78 of the potentiometer 76 is coupled by the capacitor 79 to the base 81 of a transistor 82 connected in the common emitter circuit to provide a somewhat conventional stage of amplification. Bias for the transistor 82 is supplied from a battery 84 protected by the housing 10. For the type PNP transistor shown, the positive terminal of the battery is connected to chassis ground and the negative terminal is connected to a resistor 85 and a resistor 86 in series serving as transistor stabilizing and biasing resistors for the base 81. A collector load resistor 88 is connected between the collector 89 and the negative supply terminal. The emitter 91 is returned to the positive supply terminal by way of chassis ground.

A second transistor amplifying stage comprises a transistor 93 connected in substantially the same configuration as the first stage just described. Transistor stabilization and base bias for the base 94 are provided by the resistors 96 and 97. The first stage output is coupled to the base 94 through a coupling capacitor 99.

The third amplifier stage comprises a transistor 102 connected in the common collector configuration. The base 104 of this transistor is connected to the collector 106 of the transistor 94 whereby the transistors 93 and 102 operate as a two-stage direct-coupled circuit. The collector 108 is returned directly to the negative terminal of the power supply. A lamp 109, optically associated with a photoresistor 112, serves as the emitter load resistor and receives the output of the three-stage amplifier. A lamp 131 cooperates with a photoresistor 133 in the other control channel. The function of the lamps 109 and 131 and the photoresistors 112 and 133 will be described later, herein.

The signal received by the tunable circuit 32b is rectified or demodulated and amplified by a solid-state diode 135 and a three-stage amplifier comprising transistors 136, 137 and 138. The slider 139 of a gain control potentiometer 140 is coupled to the base 141 of the transistor 136 through a coupling capacitor 142. The output of the last stage transistor 138 is connected to the second lamp 131. The three-stage amplifier protected by the housing 35 functions in the same manner as the previously described three-stage amplifier and further description is believed unnecessary.

The left-hand motor 48 is controlled by the intensity of the light beam emitted by the lamp 109 which is a measure of the received amplified signal. It will be understood that any suitable optical system may be employed to image the filament or other light source in the lamp 109 onto the photoresistor 112 and to protect the photoresistor from ambient light.

A triac 146, effectively in series with the motor 48, exercises direct control of energization of the motor and motor speed. The triac is a gate-controlled full-wave AC switch with a single external gate connection and a pair of opposing silicon controlled rectifiers. The triac will switch from a blocking state to a conducting state for either polarity of applied voltage with positive or negative gate triggering applied to the gate 148. A vibrator power supply 149, energized from the battery 84, furnishes AC power for propulsion and guidance of the mower 11. It will be understood that any AC generator or other AC power supply may be used. It is desirable that the output waveform be substantially sinusoidal so the voltage magnitude increases and then decreases during each successive half-wave. This facilitates phase control of voltage. The power supply 149 provides power for the triac 146 circuits and the circuits of a similar triac serving to control the motor 47.

One main terminal of the triac 146 is connected to one terminal of the power output transformer secondary 153. The other main terminal is connected to one terminal of the motor 48. The remaining terminal of the motor 48 and one terminal of the motor 47 are connected to the remaining terminal of the secondary 153. The motor 47, the triac 151 and the secondary 153 are connected in a similar manner.

The gate 148 of the triac 146 is connected to a network 154 serving in effect as an AC load in series with an adjustable control resistor 156. The control resistor 156 is shown as a potentiometer with its slider connected to one end of the resistor 156. The network 154 comprises capacitors 158 and 159 and a resistor 162. The voltage source for the network 154 and the control resistor 156 is the voltage across the triac. Each time the AC voltage reverses polarity, the triac extinguishes and becomes an open circuit. At this time the total AC voltage is applied to the control resistor 156 and the network 154. When the magnitude of the voltage at the triac gate becomes sufficient to fire the triac the triac becomes a short circuit until the next zero AC wave crossover. At this time the voltage applied to the control resistor 156 and the network 154 is collapsed allowing the trigger circuit to prepare for the next voltage swing. Varying the control resistor 156 varies the trigger time constant RC and, therefore, the point in time in the AC half cycle at which the triac 146 will fire. This selection of successive points on successive half cycles serves to vary the voltage and hence the power supplied to the motor to control its speed.

Selection of successive points on the half cycle is obtained in accordance with the invention by bridging the photoresistor 112 across the control resistor 156. The resistance of the photoresistor is varied in accordance with the light intensity from the lamp 109 which in turn varies in proportion to the amplified signal from the tunable circuit 31b. An increase in the total resistance of the parallel combination of the photoresistor 112 and the control resistor 156 lengthens the time constant to delay firing and reduce the motor voltage. As the signal magnitude at the base 104 of the transistor increased the photocell resistance decreases to shorten the time constant and thereby cause earlier firing in the half wave period. As a result earlier firing occurs and the speed of the motor 48 increases. It is to be noted that since the resistor 156 and the photoresistor 112 constitute a parallel combination of resistors, the resistor magnitudes should be comparable.

The motor 47 is controlled in the manner just explained for control of the motor 48. The photoresistor 133 changes the time constant of the gate circuit for the triac 151 so that the motor 47 operates under control of the signal received by the tunable circuit 32b. From one point the time constant circuit RC serves as a phase shift circuit.

From the foregoing it will be seen that as the mower 11 departs from its predetermined path to the right, as viewed from above FIG. 1, the signal at the tunable circuit 31b will decrease since the sensor 31 moves to the right away from the previously centered conductor 63. The speed of the motor 48 will then be decreased. At the tunable circuit 32b signal will increase and the speed of the motor 47 will be increased proportionally. The result is to steer the mower to the left until the conductor 63 is again centered.

A wide range of adjustment is provided by the volume controls 76 and 140 in combination with the control resistors 156 and 182. For example, maximum vehicle speed may be set initially to avoid overspeeding. Also, the time constant of the gate circuits can be set to be extremely long under no received signal conditions so that fail safe operation may be provided to stop the mower 11.

The invention described above as being embodied in a lawn mower by way of example provides an effective speed and direction control which is free of unreliable components, such as electromagnetic relays, which are subject to mechanical shocks and contact trouble. Also use of the invention eliminates the need for a steerable wheel or wheels and the complicated servomechanism necessary to rotate a shaft to change orientation of the vertical plane of the wheel or wheels.

I claim:

1. A vehicle subject to guidance and control by an external signal and an electronic control system therefor, said vehicle having a first drive wheel adjacent one end and spaced from one side, a second drive wheel spaced laterally of said vehicle from said first drive wheel to be nearer said other vehicle side, a castorlike wheel adjacent the opposite vehicle end, an electric motor means for each drive wheel, means operative to drive each wheel from its respective motor means, a first signal sensor adjacent one end of said vehicle and spaced from said one side thereof, a first electronic signal responsive means interconnecting said first sensor with said second motor means, a second signal sensor spaced from said other side of said vehicle opposite said first signal sensor, and a second electronic signal responsive means interconnecting said second sensor with said first motor means, each of said electronic signal responsive means comprising a phase shift voltage control circuit responsive to a signal received from its respective signal sensor.

2. A vehicle as in claim 1, in which each of said electronic signal responsive means includes a triac responsive to said phase shift voltage control.

3. A vehicle as in claim 2, in which signals from said sensors are amplified by a solid-state amplifier which together with said triacs constitutes a system operative under the sole control of solid-state electronic devices.

4. A vehicle subject to guidance and control by an external signal and an electronic control system therefor, said vehicle having a series of supporting wheels including first and second drive wheels spaced laterally of each other, an individual electric motor means for each drive wheel, means operative to drive each wheel from its respective motor means, first and second signal sensors spaced laterally from each other, a first electronic signal-responsive means interconnecting the first sensor with one of said motor means, and a second electronic signal-responsive means interconnecting the second sensor with the other motor means, each of said signal-responsive means comprising a phase shift control circuit responsive to a signal received from its respective signal sensor.